United States Patent
Idrén

(10) Patent No.: US 7,170,978 B2
(45) Date of Patent: Jan. 30, 2007

(54) VOICE MAIL SERVICE WHERE THE CALLER CAN CHOOSE AMONG DIFFERENT MESSAGE TYPES

(75) Inventor: Björn Idrén, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 153 days.

(21) Appl. No.: 10/497,510

(22) PCT Filed: Nov. 29, 2002

(86) PCT No.: PCT/SE02/02205

§ 371 (c)(1),
(2), (4) Date: Jun. 3, 2004

(87) PCT Pub. No.: WO03/055191

PCT Pub. Date: Jul. 3, 2003

(65) Prior Publication Data

US 2005/0053203 A1  Mar. 10, 2005

(30) Foreign Application Priority Data

Dec. 13, 2001  (SE) ................................ 0104246

(51) Int. Cl.
*H04M 11/00* (2006.01)
(52) U.S. Cl. .................. 379/88.13; 379/88.17; 379/88.18
(58) Field of Classification Search ............ 455/413; 379/88.13
See application file for complete search history.

(56) References Cited

U.S. PATENT DOCUMENTS

| | | | | |
|---|---|---|---|---|
| 5,764,901 A * | 6/1998 | Skarbo et al. | ............ | 709/204 |
| 5,790,957 A * | 8/1998 | Heidari | ............ | 455/553.1 |
| 5,844,158 A * | 12/1998 | Butler et al. | ............ | 84/650 |
| 6,333,973 B1 | 12/2001 | Smith et al. | | |
| 6,373,926 B1 * | 4/2002 | Foladare et al. | ......... | 379/88.13 |
| 6,459,776 B1 * | 10/2002 | Aktas et al. | ............ | 379/88.13 |
| 6,480,484 B1 * | 11/2002 | Morton | ............ | 370/352 |
| 7,035,620 B1 * | 4/2006 | Ben-Efraim et al. | ..... | 455/412.1 |
| 2001/0040953 A1 | 11/2001 | Riekki | | |
| 2002/0006782 A1 * | 1/2002 | Kim | ............ | 455/412 |

FOREIGN PATENT DOCUMENTS

| | | |
|---|---|---|
| EP | 0567135 A1 | 10/1993 |
| EP | 0783219 A2 | 7/1997 |
| GB | 2209257 A | 5/1989 |
| WO | WO 9953699 A2 | 10/1999 |

OTHER PUBLICATIONS

Swedish Patent Office, International Search Report for PCT/SE02/02205, dated Dec. 27. 2002.

* cited by examiner

*Primary Examiner*—Fan Tsang
*Assistant Examiner*—Simon Sing
(74) *Attorney, Agent, or Firm*—Roger Burleigh

(57) ABSTRACT

This invention presents a method to provide a more enhanced voice message system to subscribers of a voice message service, where a calling party can receive more detailed information about the called subscriber and in different kind of formats. This is done by giving the calling party the opportunity to choose between and receive different type of messages. This message type can for example be a SMS message with additional phone numbers. Furthermore it can be a WAP-link to the subscriber's personal WML-page or the vCard of the subscriber. Also EMS or MMS messages can be sent, including video presentations or maps showing driving directions or other relevant information the subscriber wants to provide.

21 Claims, 2 Drawing Sheets

VOICE MAIL SERVICE WHERE THE CALLER CAN CHOOSE AMONG DIFFERENT MESSAGE TYPES

TECHNICAL FIELD OF THE INVENTION

The present invention relates in general to telecommunications systems and methods for message service systems, and specifically to providing a more enhanced voice message service to subscribers of the voice message service, where a calling subscriber can receive more detailed information about the called subscriber and in different kind of formats.

DESCRIPTION OF RELATED ART

In current telecommunications systems, it is common for users to have a voice mail services associated with their telephone subscription. The voice mail services typically provide for the user to record a personal greeting or to select a standard greeting provided by the system. The user has the option of playing back messages left on the system, saving these messages or forwarding copies of these messages to other voice mailboxes.

Known from the patent U.S. Pat. No. 6,215,857 there is a method for a calling subscriber to place a call directly to a voice mailbox associated with a called subscriber without ringing said called subscriber, by entering some sort of activating code. With this method, the calling subscriber can immediately choose to leave a message in the voice mailbox.

European Patent application EP783219A2 shows a voice mail system that responds to a call in accordance with the number of the calling party. When the calling party is routed to the voice mail system, the call line identity, CLI, is identified by the voice mail system which responds to the calling party with a pre-programmed response. This response may be one of a voice message, an email message, a facsimile and a SMS message in the form of character string. This system provides a pre-determined response to calling party in accordance with the calling party's call line identity and as programmed into the voice mail system by the user.

SUMMARY OF THE INVENTION

The present invention addresses mainly a problem of providing information from voice mail systems to a calling subscriber, wherein the user of the voice mail system, i.e. B-party, wishes to provide more information than the normal greeting message which is played to the calling subscriber.

The object of the present invention is thus to alleviate the problem above by providing a feasible method of receiving information in different kind of formats.

In more detail, this is done by giving the calling subscriber the opportunity to receive SMS messages with additional phone numbers, receive a WAP-link or get a vCard sent to him.

An important technical advantage of the present invention is that the calling party can receive more information from the B-party than the pre-recorded message.

Another advantage of the present invention is the ability to provide a method for the calling party to choose between different message formats and different depths of information.

DESCRIPTION OF PREFERRED EMBODIMENTS

Figure 1:
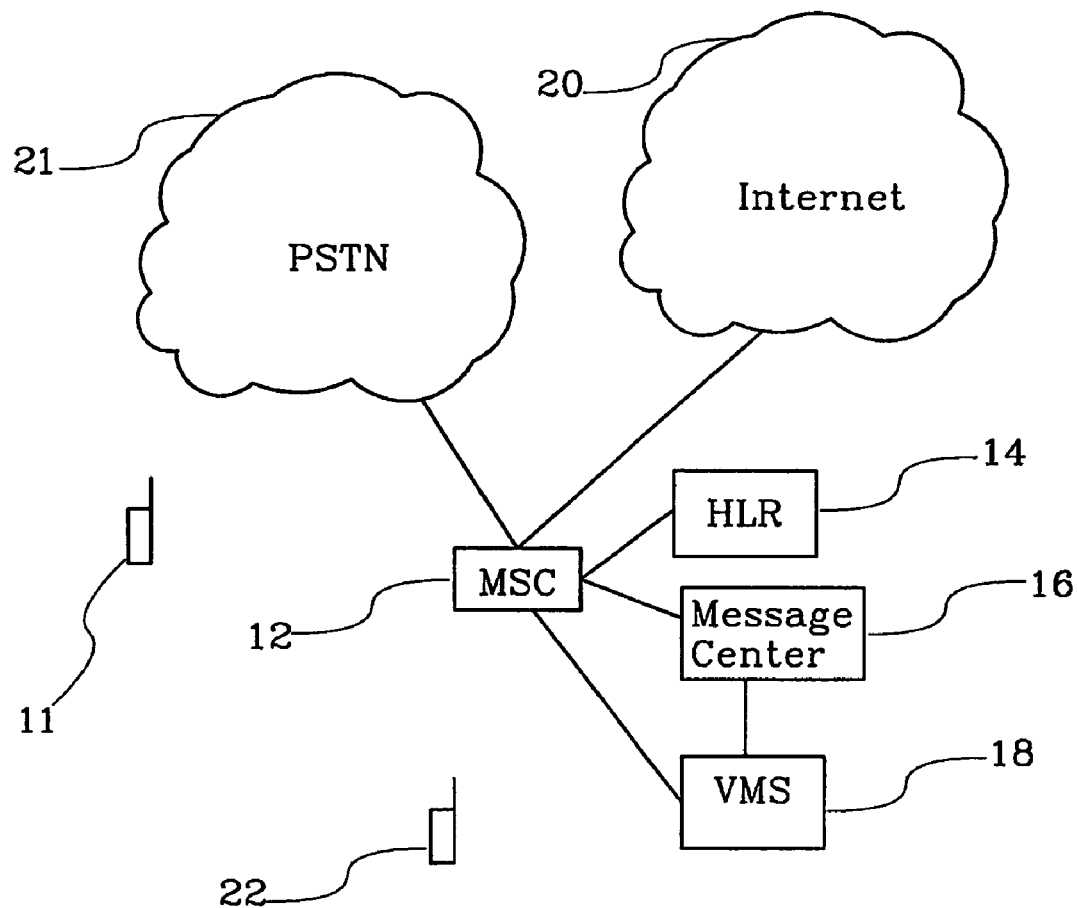
FIG. 1 shows a schematic overview of a telecommunications system of the present invention.

Referring to FIG. 1 there is shown a schematic diagram of a telecommunication system. Furthermore the logical connections between the nodes involved in the present invention are disclosed. The shown nodes involved in the present invention are a voice mail system (VMS) 18 that handles the subscribers voice mail service, a message center 16, a mobile switching center (MSC) 12, a public switched telecommunications network (PSTN) 21 and an Internet 20.

The voice mail system 18 is connected to the MSC 12 and also to the message center 16. Furthermore the MSC 12 is connected to the PSTN 21 and the Internet 20 through gateways. This means that incoming calls can be transported or originated either from the Internet or the PSTN. From this follows that a calling party can use different kind of connections, for example a fixed-line telephone, an IP-telephone connected to the Internet or a cellular phone.

The message center 16 can handle all kinds of message services, including Short Message Service (SMS), Enhanced Messaging Service (EMS) and Multimedia Messaging Service (MMS). Therefor this message center 16 can be implemented either as an SMS-Center (SMSC) or a Multimedia Messaging Center (MMC). Eitherway the message center is capable of sending messages to calling parties being connected to the voice mail system.

A call from calling party 11 is directed to the PSTN 21 when the call is made. The PSTN 21 then routes the call to the MSC 12 for a mobile subscriber who has a voice mail service, for example B-party 22. The MSC 12 typically routes the call to the mobile subscriber though a base station not shown.

In routing the call to the B-party 22, the MSC 12 typically interrogates over an SS7 signalling line to the HLR 14. The HLR 14 is the home location register, which is a register storing profile information for B-party 22. The HLR 14 also stores information as the selected services available to the B-party 22 of the wireless telecommunications network. The HLR 14 for example will also store information as to whether or not the B-party 22 has a voice mail service.

In the event that the B-party 22 cannot be contacted by the MSC 12 and the MSC 12 has been advised by the HLR 14 that there is a voice mail service provided for the B-party 22, then the MSC 12 sets up a new call which is routed to the voice mail system 18. At this point, the MSC 12 is also capable of transferring the CLI of the calling party to the voice mail system 18.

The purpose of the voice mail system 18 is then to prompt the calling party 11 with a message pre-recorded by the B-party 22.

The voice mail system 18 in the present invention further includes each subscriber's profile, including settings for his voice mail service, for example pre-recorded message and different response messages that he wants to provide.

The voice mail system 18 also comprises means for generating and sending messages via the message center, sending vCards, sending URLs, and means for playback of pre-recorded messages. An alternative implementation to save memory space in voice mail system 18 can be that the messages that is to be sent are instead stored in the message center 16, and the voice mail system 18 only initiates the message center 16 to send out the message by signalling what message to send to whom.

Vcard is an electronic business card containing vital directory information such as name, addresses, telephone numbers, email addresses and Internet URLs. A vCard can be sent via a number of media, for example telephone networks, and wireless methods such as Bluetooth, IrDA and WAP.

An URL is a location on Internet where for example a WML-page is located. WML is the file type that can be handled by a WAP enabled terminal.

The terminals intended for the present invention can be any terminal, not only SMS-, EMS-, MMS- or WAP-enabled mobile terminals. By the possibility of choosing another number where to send for example an SMS or URL, fixed-line analog telephones can be used for the method in the present invention. This means that both the calling party and the B-party can be using any kind of terminal in the present invention.

Figure 2:
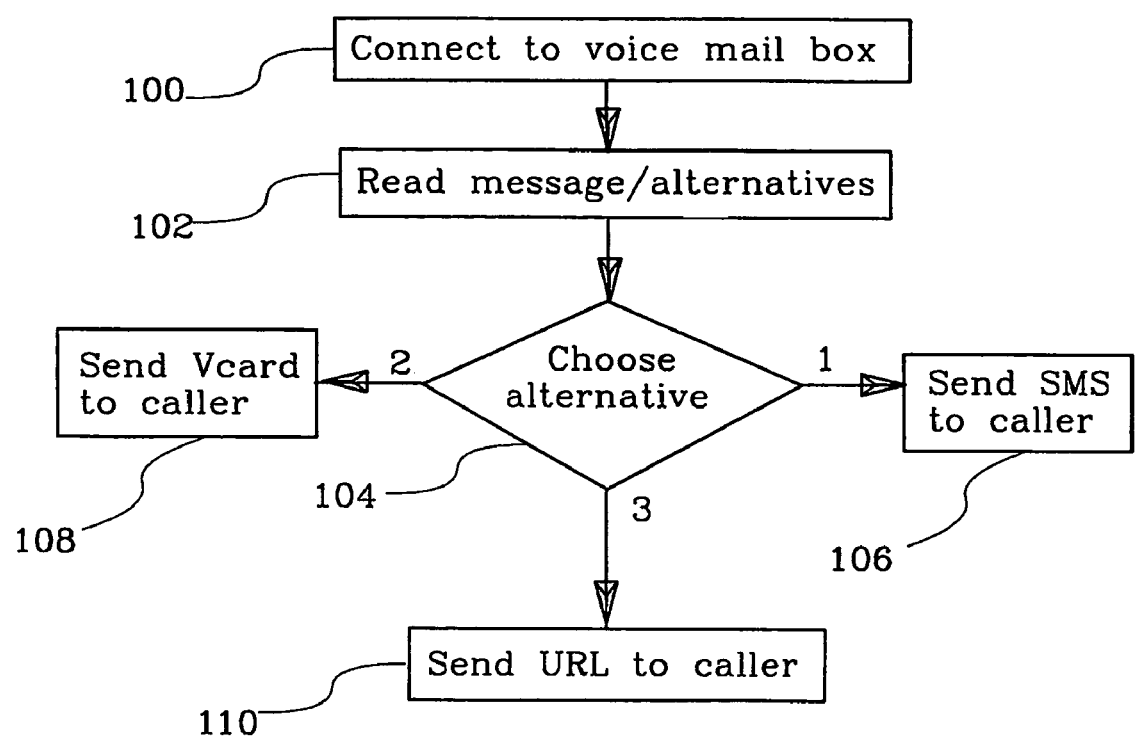
FIG. 2 illustrates a flowchart describing one embodiment of the invention.

Referring to FIG. 2 there is shown a flow chart of the steps involved in the process of the present invention for providing more detailed information from B-party 22. During the method, a call is attempted to B-party 22, but since he is not available a new call is set up and routed to his voice mail service. The first step 100 involves the calling party 11 being connected to the voice mail system 18.

This step can also include transmitting of the calling party's CLI and also determining if the calling party's 11 terminal supports WAP and vCards. All kind of settings, parameters or capabilities can be investigated in this step.

After this has been performed the voice mail system 18 playbacks the pre-recorded message or instructions in step 102. This can be done in several different ways; one way is to have a pre-recorded message from B-party 22 being played, and then the voice mail system 18 announces the available choices for the calling party. Another way is to have the B-party 22 to pre-record both message and instructions. A third way is to have the voice mail system 18 to handle everything, for example welcoming calling party 11 to B-party 22's voice mail service, and then tell what choices the calling party 11 has. Another alternative in step 102 is that the voice mail system sends the menu of choices via some kind of message, for example a SMS specifying the alternatives.

In step 104 the calling party 11 makes his/hers choice, whether he/she wants to receive a message with more detailed information, a Vcard sent to his/hers terminal, an URL sent to his/hers terminal or any other alternatives supported by the system.

One choice is to have a message sent to the calling party's terminal. This is done in step 106, which also can involve the calling party 11 to type in another number to where he wants the message to be sent, for example if his terminal does not support the selected message type, or he wants his colleague to have a copy.

The type of message provided by step 106 could for example be a text SMS including additional information about B-party 22.

It can also be an EMS including a map pointing out where B-party 22 lives or works. Another embodiment of step 106 can be sending out an MMS message containing a video presentation of B-party 22.

By using this option, the calling party 11 can choose to receive a regular text message with some information provided by the B-party 22, which for example can be his secondary phone number or a text line saying that he is on vacation. By also letting the calling party 11 to enter a number to where the text message is to be sent, the calling party 11 can do this using a fixed line phone, and sending the message to his cellular phone. Furthermore this option provides the opportunity to get maps, driving directions, video presentations, or other multimedia files.

The calling party 11 also has the choice of having a vCard sent to his terminal. This is done in step 108, where the calling party 11 also can choose to have the vCard sent to an additional or different address/terminal, for example if his terminal does not support vCard, or he wants a colleague to have a copy.

This choice gives the calling party the chance to receive the B-party's full electronic business card, and store that in his cellular phone or PDA. Also here the calling party can enter another number to where the vCard is to be sent.

Yet another choice is to have an URL sent to the calling party's terminal. This is done in step 110.

This choice lets the calling party to access the B-party's personal WAP-enabled homepage where additional information can be stored. This choice can automatically be removed from the menu if the calling party's phone is discovered to not be WAP-enabled. Or the calling party can as in the other options enter a number to where he wants the URL to be sent.

These above mentioned choices gives the calling party several options to receive the information depth he wishes at the moment, everything from a regular text message with the B-party's phone number to a multimedia message including a video clip or the B-party announcing something, or an music clip, or another kind of multimedia content.

The invention is not limited to the above described embodiments, but can changed and modified without departing from the invention; for example changes in the environment can cause changes to the above-described structure. The voice mail system can for example be incorporated in another kind of communication system, and the owner of the voice mail service can be located in a fixed telephone network.

The invention claimed is:

1. A method for providing a calling party information about the called party, the method comprising the steps of:
   a) a calling party connecting to a voice mail system associated with said called party;
   b) said voice mail system playing a pre-recorded message and/or instructions;
   c) said calling party choosing among two or more message types offered by said voice mail system; and,
   d) in response to said choice of said calling party, determining whether said calling party's terminal is capable of receiving said chosen message type and transmitting a response in accordance with said chosen message type to said calling party whenever said calling party's terminal is capable of receiving said chosen message type, wherein the content of said response includes predefined information associated with said called party.

2. The method in accordance with claim 1, wherein step a) further includes the step of transmitting a calling party's Calling Line Identification to said voice mail system.

3. The method in accordance with claim 1, wherein step c) further includes the step of determining whether said calling party's terminal is capable of receiving said two or more message types and only offering message types that said calling party's terminal is capable of receiving.

4. The method in accordance with claim 1, wherein the said response to said calling party is comprised of a vCard.

5. The method in accordance with claim 1, wherein said response to said calling party comprises a URL.

6. The method in accordance with claim 1, wherein said response is comprised of a SMS message.

7. The method in accordance with claim 1, wherein said message is comprised of an EMS message.

8. The method in accordance with claim 1, wherein said message is comprised of a MMS message.

9. The method in accordance with claim 1, further comprising the step of said calling party entering a number to where said response is to be sent to said calling party or a third party.

10. The method in accordance with claim 1, wherein said choice is made by entering numbers on a keypad of said calling party's terminal.

11. The method in accordance with claim 1, wherein said choice is made by voice.

12. A system for providing information about a called party when a calling party is unable to connect to the called party and is instead connected to a voice mail system associated with said called party, said system comprising:
 means for playing, by said voicemail system, pre-recorded messages;
 means for letting said calling party choose among two or more message types offered by said voice mail system; and
 means for determining whether said calling party's terminal is capable of receiving said chosen message type and sending, in response to said choice by said calling party, a response in accordance with said chosen message type to said calling party whenever said calling party's terminal is capable of receiving said chosen message type, wherein the content of said response includes predefined information associated with said called party.

13. The system in accordance with claim 12, wherein the system further comprises means to handle an incoming Calling Line Identification and sending said response to that number.

14. The system in accordance with claim 12, wherein the system further comprises means for detecting if said calling party's terminal is capable of receiving said two or more message types and only offering message types that said calling party's terminal is capable of receiving.

15. The system in accordance with claim 12, wherein the system further comprises means for sending SMS messages.

16. The system in accordance with claim 12, wherein the system further comprises means for sending EMS messages.

17. The system in accordance with claim 12, wherein the system further comprises means for sending MMS messages.

18. The system in accordance with claim 12, wherein the system further comprises means for sending messages comprised of a vCard.

19. The system in accordance with claim 12, wherein the system further comprises means for sending messages comprised of an URL.

20. The system in accordance with claim 12, wherein the system further comprises means for prompting said calling party to enter an alternative number where the response is to be sent to said calling party or a third party.

21. The system in accordance with claim 12, wherein the system instead of means for generating said response, comprises means for signalling the a message center to send said response in accordance with said chosen message type.

\* \* \* \* \*